(12) United States Patent
    Li

(10) Patent No.: US 12,539,471 B2
(45) Date of Patent: Feb. 3, 2026

(54) PRODUCTION SYSTEM, PRODUCTION METHOD AND APPLICATION OF GENERAL-PURPOSE HIGH-PURITY CHEMICALS

(71) Applicant: BEIJING UNIVERSITY OF CHEMICAL TECHNOLOGY, Beijing (CN)

(72) Inventor: Qunsheng Li, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 563 days.

(21) Appl. No.: 17/955,687

(22) Filed: Sep. 29, 2022

(65) Prior Publication Data
    US 2024/0042343 A1   Feb. 8, 2024

(30) Foreign Application Priority Data
    Aug. 4, 2022 (CN) ......................... 202210931848.0

(51) Int. Cl.
    B01D 3/14         (2006.01)
    B01D 3/00         (2006.01)
    (Continued)

(52) U.S. Cl.
    CPC ............. *B01D 3/143* (2013.01); *B01D 3/007* (2013.01); *B01D 3/36* (2013.01); *B01D 3/40* (2013.01);
    (Continued)

(58) Field of Classification Search
    CPC ............ B01D 15/08; B01D 2009/0086; B01D 3/007; B01D 3/143; B01D 3/145; B01D 3/163; B01D 3/22; B01D 3/36; B01D 3/40; B01D 53/002; B01D 53/268; B01D 9/0045; C01B 2210/001; C01B 2210/0014; C01B 33/1071; C01B 33/10784; Y02P 20/10
    See application file for complete search history.

(56) References Cited

U.S. PATENT DOCUMENTS

| | | | |
|---|---|---|---|
| 11,325,063 B2 * | 5/2022 | Li | ........................ C01B 7/195 |
| 2021/0009417 A1 * | 1/2021 | Li | ........................ C01B 15/013 |

* cited by examiner

*Primary Examiner* — Dirk R Bass
(74) *Attorney, Agent, or Firm* — HOWARD M COHN and Associates, LLC

(57) ABSTRACT

A production system, production method and application of general-purpose high-purity chemicals are disclosed. The production system includes a raw material tank, and an adsorption system, a crystallizer, a first light-impurity removal tower, a first heavy-impurity removal tower, a second light-impurity removal tower, a motorized tower, a second heavy-impurity removal tower, a vapor permeation device, a membrane separation system and a filling system connected with the raw material tank in sequence. The high-purity chemicals produced by the above system have high purity and excellent quality. Compared with the prior art, the system and method designed by the present disclosure have more pertinence, integrity, progressiveness, energy-saving, precision, high safety coefficient and great industrial promotion value. And the products produced are of excellent quality, which can meet the standards applied to the manufacturing of integrated circuit electronic components and meet the high-end needs of the semiconductor industry market.

10 Claims, 7 Drawing Sheets

(51) Int. Cl.
  *B01D 3/36* (2006.01)
  *B01D 3/40* (2006.01)
  *B01D 9/00* (2006.01)
  *B01D 15/08* (2006.01)
  *B01D 53/00* (2006.01)
  *B01D 53/26* (2006.01)
  *C01B 33/107* (2006.01)

(52) U.S. Cl.
  CPC ............ *B01D 9/0045* (2013.01); *B01D 15/08* (2013.01); *B01D 53/002* (2013.01); *B01D 53/268* (2013.01); *C01B 33/1071* (2013.01); *C01B 33/10784* (2013.01); *B01D 2009/0086* (2013.01); *C01B 2210/001* (2013.01); *C01B 2210/0014* (2013.01)

PRODUCTION SYSTEM, PRODUCTION METHOD AND APPLICATION OF GENERAL-PURPOSE HIGH-PURITY CHEMICALS

CROSS REFERENCE TO RELATED APPLICATION

This patent application claims the benefit and priority of Chinese Patent Application No. 202210931848.0 filed on Aug. 4, 2022, the disclosure of which is incorporated by reference herein in its entirety as part of the present application.

TECHNICAL FIELD

The present disclosure relates to the technical field of high-purity or ultra-high-purity chemicals, and more specifically, to a production system, production method and application of general-purpose high-purity/ultra-high-purity chemicals.

BACKGROUND ART

In recent years, with the high-end development of many fields such as chemical industry, petrochemical industry, medicine, biology, food industry, aerospace and electronic information industry, the quality requirements for the production of chemicals have become higher and higher, and high-purity/ultra-high-purity chemicals have become the key raw materials urgently needed by the current chemical industry. For example, in the chip manufacturing industry where many countries in the world intend to seize the commanding heights, high-purity/ultra-high-purity chemicals have become the most critical and representative basic materials in the production process in this field. Its purity and cleanliness have a great impact on the final product quality. At the same time, under the current background of the times, high-purity/ultra-high-purity chemicals become important strategic materials urgently needed by the country, and the production situation is very serious. In the complete production process, the separation and purification section are the most critical. The effect of these steps is the core factor that determines the quality of the final product.

Taking integrated circuit (IC) as an example, the products are developing towards large-scale, super large-scale and extremely large-scale, the chip integration is growing rapidly, and the lithographic lines on the wafer surface are getting thinner and thinner. It also puts forward extremely strict quality requirements and analysis and detection requirements for the purity and trace impurity content of high-purity/ultra-high-purity chemicals. Integrated circuit production mainly includes three links: design, manufacturing and packaging. High-purity/ultra-high-purity chemicals are widely used in the latter two links, including silicon-based materials, photoresist, ultra-clean and high-purity reagents, electronic special gases, masks, etc., which are the leading foundation in the whole integrated circuit field. Therefore, once the high-purity/ultra-high-purity chemical raw materials are restricted, the electronic manufacturing industry, including the integrated circuit, will be severely hit.

In view of the strict technical requirements of high-purity/ultra-high-purity chemicals, the high threshold of production and manufacturing process, the large-scale construction cost of factories, and the rapid replacement of the products obtained, achieving the independent research and development and large-scale production of high-purity/ultra-high-purity chemicals in China is an important guarantee for improving international competitiveness in this field. However, at present, China's related industries, including integrated circuit, are still in the stage of starting, exploration and transformation. The production and manufacturing level is low, and it is impossible to achieve large-scale and high-end products. Also, in the field of integrated circuit, for example, there are only a few domestic enterprises whose production technology level has reached G2 level in recent years. Among them, few of them can provide samples of G3 products, but cannot achieve large-scale industrial applications Therefore, how to develop a general-purpose high-purity/ultra-high-purity chemical production process with energy saving, high product purity and good quality is an urgent problem to be solved.

SUMMARY

In view of the above, the present disclosure provides a production system, production method and application of general-purpose high-purity chemicals. Compared with the prior art, the system and method designed by the disclosure are more pertinent, complete, advanced, energy-saving and precise, have a high safety factor, and have great industrial promotion value. And the products produced are of high purity and excellent quality, which can meet the standards used in the manufacture of integrated circuit electronic components and meet the high-end needs of the semiconductor industry market.

In order to achieve the above effects, one of the objects of the present disclosure is to provide a production system of general-purpose high-purity chemicals.

The production system of general-purpose high-purity chemicals specifically includes: a raw material tank, and an adsorption system, a crystallizer, a first light-impurity removal tower, a first heavy-impurity removal tower, a second light-impurity removal tower, a motorized tower, a second heavy-impurity removal tower, a vapor permeation device, a membrane separation system and a filling system connected with the raw material tank in sequence.

The adsorption system includes a first adsorption device and a second adsorption device. An outlet of the first adsorption device is connected to a feed port of the second adsorption device, and an outlet of the second adsorption device is connected to a feed port of the crystallizer through an adsorption system condenser.

The beneficial effects of adopting the above technical scheme include at least the following aspects. The present disclosure uses various chemicals from different sources as raw materials, and removes water, hydrocarbon bonds, hydrogen oxygen bonds and various trace impurities in the raw materials with high absorption intensity of light, which are prone to association reaction during subsequent separation and thus affect the separation effect through the first adsorption device. Then, water and organic substances such as benzene, phenol, benzoic acid and some metal ions are removed from the raw materials through the second adsorption device. The adsorbed materials are separated and purified through continuous multi-stage countercurrent stepwise crystallization method or recrystallization method. Subsequently, further separation and purification are carried out by distillation to remove the light impurities and heavy impurities contained in the raw materials. Meanwhile, extractive distillation, azeotropic distillation, complexation extractive distillation and other special distillation technologies are adopted for different systems to achieve effective separation and purification of raw materials. Finally, water and other impurities are deeply removed by the vapor permeation device. Finally, trace solid particles, metal ions and other impurities are removed by membrane separation, and the obtained products enter the filling system. The production system designed by the present disclosure has the advantages of energy saving, high product purity and good quality, and can obtain high-purity/ultra-high-purity chemicals that can be used for the manufacture of integrated circuit electronic components.

Further, in chemical production, it is often encountered that the relative volatility of the components to be separated is close to 1, or the system forming azeotropes, or other complex and difficult separation systems. At this time, it is difficult to achieve separation by ordinary distillation. Special distillation technology is a special distillation method specially developed for such special systems, including extractive distillation, azeotropic distillation, complex distillation, reactive distillation, etc.

Extractive distillation: the principle is to increase the relative volatility of the original components by adding another component (extractant) to the raw material liquid, so as to break the azeotrope and realize the separation of azeotropes.

Azeotropic distillation: the principle is to change the relative volatility of the systems to be separated, and realize the separation by forming a new azeotrope with the added azeotropic agent and one or more of their components. Generally, it is divided into two types: homogeneous azeotropic distillation and heterogeneous azeotropic distillation.

Preferably, the raw material tank is connected with a tower kettle inlet of the first adsorption device through an adsorption system heating device.

The upper and lower parts of the crystallizer are provided with a heat preservation device, the middle part is provided with a feed port, and the upper and lower parts of the crystallizer are respectively provided with a residual liquid overflow port and an intermediate product outlet.

Further, the heat preservation device may be a heat preservation jacket, and a heating mixing pipe is arranged inside the heat preservation jacket, which can make the temperature of each position different, and each position is also provided with a temperature measuring device.

Further, a stirring device is installed inside the crystallizer, which is driven by a motor. The blades of the stirring device are evenly distributed below the liquid level, so that full stirring can be achieved.

Preferably, the first adsorption device and the second adsorption device are connected in series, and both the first adsorption device and the second adsorption device are provided with an adsorption tower and a desorption tower. Two towers are used to complete the adsorption and desorption process in turn, and the first adsorption device and the second adsorption device blow nitrogen or other desorbed gas into the adsorption tower to desorb impurities after the adsorption is completed, so that nitrogen or other gas can be recycled.

Preferably, a tower top of the first light-impurity removal tower is connected with a first light-impurity removal tower condenser for condensation reflux, a tower kettle outlet is connected with an inlet of the first heavy-impurity removal tower through a first light-impurity removal tower reboiler, and a kettle liquid is reboiled through the first light-impurity removal tower reboiler.

One outlet of the first heavy-impurity removal tower is connected to an inlet of the first heavy-impurity removal tower through the first light-impurity removal tower reboiler, and the other outlet of the first heavy-impurity removal tower is connected to an inlet of the second light-impurity removal tower through a first heavy-impurity removal tower condenser, and condensation reflux is performed through the first heavy-impurity removal tower condenser. A tower kettle is connected with the first heavy-impurity removal tower reboiler for kettle liquid reboiling.

A tower kettle outlet of the second light-impurity removal tower is connected with an inlet of the motorized tower through a second light-impurity removal tower reboiler, and a kettle liquid is reboiled through the second light-impurity removal tower reboiler.

A tower top of the motorized tower is connected with a motorized tower condenser for condensation reflux, a tower kettle outlet is connected with an inlet of the second heavy-impurity removal tower through a motorized tower reboiler, and a kettle liquid is reboiled through the motorized tower reboiler.

A tower top of the second heavy-impurity removal tower is connected with a second heavy-impurity removal tower condenser for condensation reflux, and is connected with an inlet of the vapor permeation device through the second heavy-impurity removal tower condenser. The tower kettle is connected with a second heavy-impurity removal tower reboiler for kettle liquid reboiling.

An outlet of the vapor permeation device is connected with an inlet of the membrane separation device through a condenser.

Preferably, the first light-impurity removal tower, the first heavy-impurity removal tower, the second light-impurity removal tower, the motorized tower and the second heavy-impurity removal tower all adopt tray tower, packed tower or tray packed composite tower.

Both the tray tower and the tray packed composite tower adopt advanced tray structure, and the tray is provided with screen holes, float valves or cap channels with uniform size and specifications arranged and distributed in a regular triangle manner. At the same time, guide holes may be set on the surface of the tray, the liquid flows horizontally from a liquid receiving area to a downcomer, and the gas flows upward through the screen holes, float valves or cap channels.

The tray is provided with an overflow weir area, wherein a height of the overflow weir area is greater than a bottom gap height of the downcomer, and an area of the liquid receiving area is greater than an area of the inlet of the downcomer.

Further, the opening density and direction of the guide holes are different in different areas of the tray, which are specifically determined to promote the flow of the fluid piston on the tray, and can be adjusted according to the distribution of the fluid on the tray surface. The height range of the guide holes is 1~10 mm, which can be 2 mm, 3 mm, 4 mm or any value between the two. The width range is 5~50 mm, and can be 10 mm, 30 mm, 50 mm or any value between the two, and the opening shape is similar to trapezoid.

Or, the first light-impurity removal tower, the first heavy-impurity removal tower, the second light-impurity removal tower, the motorized tower and the second heavy-impurity removal tower all adopt a new tower body structure. A top of the tower is provided with an amplification section, and a diameter of the tower top is greater than a diameter of the lower tower. By adopting large diameter, the gas rising speed in this section is reduced, and the entrainment of mist in the process can be effectively reduced.

Preferably, the tower top of the second heavy-impurity removal tower is further provided with a mist eliminator. The mist eliminator adopts impact separation baffle, wire mesh demisting, fiber demisting or other methods to effectively separate the mist and gas. The mist eliminator is arranged in a single-layer or multi-layer structure.

The mist eliminator is a micro removal technology developed to solve the separation problem of extremely low impurity content of high-purity/ultra-high-purity chemicals. Since a certain number of liquid droplets or liquid foam of different sizes are generated in the gas phase leaving the packing layer or tray, and tiny liquid particles are entrained in the gas phase in the subsequent condensation process, the mist eliminator is designed to remove the liquid droplets entrained in the gas flow.

Installation of the mist eliminator: the mist eliminator is installed above the first tray or packing and is placed vertically. Two layers of structure can be designed for mist removal, with a distance of 10-30 cm between the two layers.

The vapor permeation device is provided with a vapor permeation membrane, and a configuration of the vapor permeation membrane includes a plate type, a tube type, a hollow fiber type and other forms.

The vapor permeation membrane includes PVA membrane, NaA molecular sieve membrane, T-type molecular sieve membrane, MOR molecular sieve membrane and other kinds of organic or inorganic membranes. And a membrane material is any one or a combination of several of polysulfone, polyphenylene ether, aromatic polyamide, polytetrafluoroethylene, polypropylene, polyacrylonitrile, polyvinyl alcohol, polyphenylimidazole or polyimide.

The membrane separation system adopts nanofiltration, microfiltration, ultrafiltration, reverse osmosis, pervaporation and other membrane separation modes.

The filling system includes a buffer tank, a product tank, a vacuum group, a sampling tank, a sampling port, and multiple pneumatic valves and diaphragm valves. At the same time, each device is equipped with a pressure indicator. Before filling, it is necessary to vacuum each tank and judge whether it meets the standard according to the pressure indicator. The sampling tank and the sampling port are used to detect the product purity.

Further, the product tank is provided with a feed port, a vacuum pipe port, a pressure indicator, a liquid level indicator and a spring triangle safety valve, and an inner lining of the product tank is made of PPH material, borosilicate glass, quartz glass, polyethylene, polytetrafluoroethylene, polyvinylidene fluoride, Teflon, PFA or other materials.

The second object of the present disclosure is to provide a production method of general-purpose high-purity chemicals, which specifically includes the following steps.

1) Adsorption: chemical raw materials from different sources are transported from the raw material tank to the first adsorption device to remove water, hydrocarbon bonds, hydrogen oxygen bonds and trace impurities with high light absorption intensity and easy to occur association reaction in a separation process to obtain treated materials, then the treated materials are transported to the second adsorption device for deep removal of water, organic matter and metal ions to obtain gas materials after removal, and the gas materials after removal are transported to the adsorption system condenser to be condensed into liquid phase and then transported to the crystallizer.

2) Crystallization: separation and purification of materials are realized by continuous multi-stage countercurrent stepwise crystallization method or recrystallization method according to the difference in melting point between the target product and various impurities to obtain intermediate products with high purity at the bottom or top of the crystallizer, and the intermediate products are transported to the first light-impurity removal tower.

3) Distillation:

31) The intermediate products pass through the first light-impurity removal tower to remove light component impurities in the material. The kettle liquid I, mainly the target product, and other heavy component impurities are transported to the first heavy-impurity removal tower to remove heavy component impurities and an enriched product is obtained. The enriched product is transported to the second light-impurity removal tower. The light component impurities are further removed through the second light-impurity removal tower, and then kettle liquid II is transported to the motorized tower.

32) Light component impurities or heavy component impurities are further removed by the motorized tower according to a composition of raw materials to obtain a produced liquid, then the produced liquid is transported to the second heavy-impurity removal tower to remove heavy component impurities to obtain a purified product, and the purified product is transported to the vapor permeation device.

4) Vapor permeation: after removing entrained liquid droplets in gas flow by the mist eliminator, the purified product is directly transported to the vapor permeation device through gas phase extraction for deep dehydration and impurity removal, then a permeate is extracted from a permeate side of the vapor permeation membrane, and a high-purity product vapor is obtained on the other side. Then the condensed product vapor is transported to the membrane separation device after the product vapor is condensed by the condenser.

5) Membrane separation: the trace solid particles, metal ions and other impurities are deeply removed by the membrane separation device to obtain a target product, and the target product is delivered to the filling system.

Preferably, the continuous multi-stage countercurrent stepwise crystallization method described in step 2) specifically includes following steps. The liquid phase enters the crystallizer to generate crystals in a crystallization section, settles to a separation section for separation and purification, and then enters a melting section for melting into liquid. Then one part of the tower bottom liquid is output as a product, and the other part is used as a reflux liquid for mass transfer. As the reflux liquid flows upward, the purity gradually decreases, and the reflux liquid is discharged out of the crystallizer as a residual liquid after crystallization separation in the crystallization section.

A specific location where the solid-liquid countercurrent contact occurs is the separation section, where the solid and the liquid continuously undergo phase change and countercurrent washing, and a crystal slurry in the separation section forms a crystal bed. At the same time, due to the temperature difference between the crystallization section and the melting section of the continuous multi-stage countercurrent stepwise crystallization method and the mass transfer in the separation section, there are temperature distribution and concentration distribution in the crystallizer at the same time. As the concentration of reflux solution for countercurrent washing of the crystal increases continuously during the falling process, the purity of the crystal also gradually increases. After the final melting, intermediate products with high purity are obtained and sent to the first light-impurity removal tower.

Further, basic step of the recrystallization method described in step 2) is the process of dissolving a substance in a solvent or melting, and then recrystallizing from the solution or molten body, so that the impure substance can be purified, or the substances mixed together can be separated from each other.

Preferably, the first adsorption device described in step 1) uses molecular sieve as an adsorption medium, the molecular sieve is hexagonal mesoporous or cubic mesoporous, and the pore size is optimized. Specifically, the pores are adjusted by using an organic pore expanding agent or a surfactant, and an active material is loaded on the molecular sieve. The active material is alkali, fluoride, hydrophilic group or metal.

The first adsorption device mainly adsorbs and removes water, hydrocarbon bonds, hydrogen oxygen bonds and other trace impurities with high light absorption intensity, which are prone to association reaction during subsequent separation and thus affect the separation effect. After pore size optimization of molecular sieve, the structure can solve the problems of easy collapse and unstable structure of large pore size channel of molecular sieve on the one hand, and is conducive to the entry of separation system and the completion of adsorption process on the other hand. At the same time, the specific surface area of the molecular sieve is increased by optimizing the pore size, so as to increase the adsorption rate and increase the capacity of the molecular sieve, which effectively improves the adsorption effect of the molecular sieve.

Further, the active substance is loaded on the molecular sieve. The impurity characteristics in the raw material gas are separated by using the loaded active substance. For example, some alkalinous loaded active substance can be used to remove the acid gas in the raw materials, and $TiO_2$ loaded substance can also be used to adsorb and remove NOx, further enhancing the adsorption capacity and selectivity of molecular sieves and effectively separating the impurities in the raw materials.

Preferably, the second adsorption device uses an adsorption resin as the adsorption medium, mainly for removing water, organic substances such as benzene, phenol and benzoic acid, and some metal ions in the raw material. The adsorption resin is improved by optimizing pore size and composite material. For example, for the separation of complex systems, the method of compounding with EPR, EPDM, SBS or other polymer compounds is adopted to optimize and control the pore size and its distribution, which effectively increases the adsorption capability, capacity and adsorption rate of the resin as a whole, and extends the service life of the resin.

Further, a three-dimensional spatial structure is formed inside the resin and/or a random cluster structure is formed outside the adsorption resin. The three-dimensional spatial structure can increase the stability and selectivity of the resin. The random cluster structure can further increase the specific surface area of the resin. Specifically, small particles are added to a liquid hydrocarbon. The small particles are styrene, a-methylstyrene, methyl methacrylate or propionitrile, and then the corresponding monomers are added, and the monomers are aggregated through an adsorption of small particles.

Preferably, the distillation in step 3) includes but is not limited to extractive distillation, azeotropic distillation or complexation extractive distillation.

Or, the distillation increases a relative volatility among the original components and realizes the separation of azeotropes by adding another component to the intermediate product and/or the kettle liquid I and/or the enriched product and/or the kettle liquid II and/or the produced liquid.

Or, the distillation realizes separation by changing a relative volatility between systems to be separated and forming a new azeotropic system with one or more components by using an azeotropic agent. The basis of the azeotropic distillation is that the azeotropic agent forms an azeotrope with at least one component in the raw material, and the boiling point of the azeotrope formed is different from the boiling point of the separated pure component or the original azeotrope point by more than 5° C.

Or, the distillation brings the systems to be separated into contact with the complex extractive solvent system, and the complexing agent forms a complex with the systems to be separated, and the complex is transferred to the extractive phase to realize separation, which overcomes the disadvantages of consuming a large amount of expensive reactants and changing the chemical form of reaction products in many separation process.

Further, the screening of the solvent according to the present disclosure generally includes two types. One is the property constraint method which defines the required extractant according to specific principles, mainly including empirical method, experimental method and thermodynamic determination method. The other one is the computer optimization method, which selects the best extractant matching the system to be separated from the molecular level by the computer according to the selection index of extractant, mainly including computer-aided molecular design method and artificial neural network method.

According to the empirical method, experimental method and thermodynamic determination method, for example, for the separation of methanol/ethyl formate system, since EG and DMSO can form intermolecular hydrogen bonds with methanol, but cannot form with ethyl formate, it can be seen from the empirical method that EG and DMSO can be selected as extractants of the system. Subsequently, through ternary vapor-liquid equilibrium experiment and relevant thermodynamic measurement, it can be found that the extraction effect of DMSO is better than that of EG, so DMSO is finally selected as the best extractant.

Molecular simulation calculation and screening method are commonly used in the computer optimization method. From the molecular level, the selectivity of the separation system, the shielding charge density distribution of each molecule/ion and the excess enthalpy are calculated. Through these data, the interaction between the extractant and the system to be separated is analyzed, and then the influence of the extractant on the phase equilibrium behavior of the system to be separated is accurately predicted, so as to screen the efficient extractant.

COSMOtherm X or other application software is often selected as a screening tool for extractants. The molecular structure and properties of the chemical substances involved are provided by the database provided by the software. For example, for the separation of isopropyl ether/isopropanol azeotrope system, COSMOtherm X calculates the selectivity of 108 ionic liquids composed of nine cations and 12 anions. It is found that [EMIM] [OAC] has high selectivity, so this ionic liquid is finally selected as the extractant.

Further, the complex extractive solvent system is generally composed of a complexing agent, a cosolvent and a diluent.

The complexing agent should be easy to form complex and easy to regenerate, and the complexing agent has good thermal stability, is not easy to decompose or degrade, and avoids irreversible loss in the process. For example, for the separation of 1-naphthylamine/β-naphthylamine system by complexation extractive distillation, FeCl$_3$, FeCl$_2$, FeSO$_4$, CuCl$_2$ or their mixtures can be selected as complexing agents. These complexing agents form complexes with naphthylamine and the stability of the complex formed with β-naphthylamine is much greater than that of the complex formed with 1-naphthylamine.

As a good solvent of a complexing agent, the cosolvent can promote the formation of complexes and phase to phase transfer. For example, in the process of complexation extractive distillation of dilute butyric acid solution, amines are used as complexing agents, n-alkanes are used as diluents, and high-carbon alcohols is used as regulating cosolvents, which greatly promotes the formation of complexes and the process of complexation extractive distillation.

The diluent is mainly used to adjust the viscosity, density, interfacial tension and other parameters of the formed mixed solution, so that the whole complexation extractive distillation process is easy to implement. For example, in the process of recovering dilute acetic acid solution by complexation extractive distillation, trialkylamine is used as the complexing agent, while n-octanol and kerosene are used as diluents. It is found that the complexation ratio of trialkylamine and acetic acid gradually increased with the addition of diluents, which effectively promoted the process of complexation extractive distillation.

Preferably, in step 3), the first light-impurity removal tower, the first heavy-impurity removal tower, the second light-impurity removal tower, the motorized tower and the second heavy-impurity removal tower all extract corresponding impurities from the tower top or the tower kettle or a side extracting port opened at a sideline impurity enrichment position.

The first light-impurity removal tower, the first heavy-impurity removal tower, the second light-impurity removal tower, the motorized tower and the second heavy-impurity removal tower all adopt multi tower differential pressure integrated distillation energy-saving technology, at least one of the first light-impurity removal tower, the first heavy-impurity removal tower, the second light-impurity removal tower, the distillation tower and the second heavy-impurity removal tower are pressurized or depressurized, and the tower top vapor is used as a heating medium of the reboiler of the other tower. Thus, the external heat source is saved, and energy saving and consumption reduction are realized.

Or, at least one of the first light-impurity removal tower, the first heavy-impurity removal tower, the second light-impurity removal tower, the motorized tower and the second heavy-impurity removal tower adopt a heat pump technology to raise a temperature and pressure of the tower top vapor through a compressor, and the tower top vapor serves as a heating medium of the reboiler to recover a condensation latent heat of the tower top vapor, which effectively recovers the condensation latent heat of tower top vapor and reduces the consumption of utilities.

The third object of the present disclosure is to provide the application of a general-purpose high-purity/ultra-high-purity chemical, and the application of the chemicals obtained according to the above-mentioned production method to integrated circuit electronic components.

In summary, the beneficial effects of the present disclosure include at least the following aspects.

(1) The purity of the product obtained by the disclosure can meet the standard for manufacturing integrated circuit electronic components and meet the high-end demand of the semiconductor industry market.

(2) Compared with the existing electronic chemical production method, the process of the disclosure is more targeted, complete, progressiveness and precise, with high safety factor, and has great industrial promotion value and market application prospect.

(3) The disclosure is applicable to chemical raw materials of different sources and types such as recycled materials of chemical plants, waste materials of chemical plants, industrial grade chemical raw materials, high-purity chemical raw materials, and high-grade chemical raw materials. For the original impurities and the new impurities that may be produced in each step of the separation process, different separation methods are used to remove them in depth, and the products produced have the characteristics of ultra-high purity and high quality.

(4) The adsorption system of the production system designed by the disclosure uses advanced molecular sieves and adsorption resins as adsorbents respectively. The continuous multi-stage countercurrent stepwise crystallization method or recrystallization method is adopted for crystallization. The tray tower, packed tower or tray packed composite tower are adopted for distillation. And extractive distillation, azeotropic distillation, complexation extractive distillation and other special distillation technologies are adopted for distillation. Finally, the combination of gas membrane separation technology and liquid phase membrane separation is adopted to deeply remove impurities. The equipment is mature and reliable in technology, stable in operation, and continuous in production.

(5) The distillation process of the present disclosure adopts various energy-saving technologies, effectively recovers and utilizes heat while producing high-quality products, reduces utility consumption, and realizes energy saving and consumption reduction.

(6) The filling system designed by the present disclosure adopts a combination of multiple optimized structures to ensure the cleanliness of equipment materials and effectively avoid secondary pollution of final products.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following description are only embodiments of the present disclosure. For those of ordinary skill in the art, other drawings can be obtained based on the drawings disclosed without creative work.

In FIG. 1-FIG. 3:

1 is a raw material tank; 2 is a adsorption system heating device; 3 is a first adsorption device; 4 is a second adsorption device; 5 is an adsorption system condenser; 6 is a crystallizer; 7 is a first light-impurity removal tower; 8 is a first light-impurity removal tower condenser; 9 is a first light-impurity removal tower reboiler; 10 is a first heavy-impurity removal tower; 11 is a first heavy-impurity removal tower condenser; 12 is a first heavy-impurity removal tower reboiler; 13 is a second light-impurity removal tower; 14 is a heat pump compressor; 15 is a second light-impurity removal tower reboiler; 16 is a heat pump condenser; 17 is a motorized tower; 18 is a motorized tower condenser; 19 is a motorized tower reboiler; 20 is a second heavy-impurity removal tower; 21 is a mist eliminator; 22 is a second heavy-impurity removal tower condenser; 23 is a second heavy-impurity removal tower reboiler; 24 is a vapor permeation device; 25 is a condenser; 26 is a membrane separation device; 27 is a filling system;

A is a pipeline from the crystallization section to the first light-impurity removal tower section; B is a pipeline from the second heavy-impurity removal tower section to the vapor permeation section.

Figure 4:
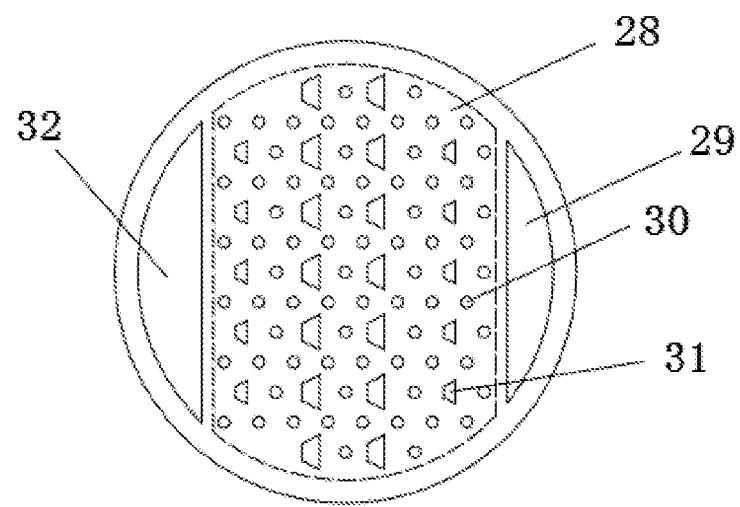
FIG. 4 is a structural diagram of the tray in a distillation process according to an embodiment of the present disclosure.
Figure 5:
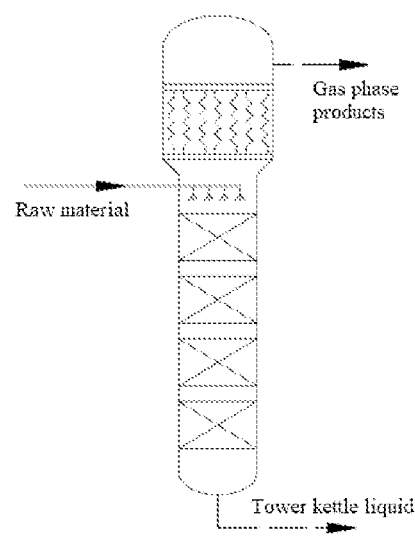
FIG. 5 is a structural diagram of the mist eliminator according to an embodiment of the present disclosure.

In FIG. 4:

28 is an opening area; 29 is a downcomer; 30 is a sieve hole; 31 is a guide hole; 32 is a liquid receiving area.

Figure 6:
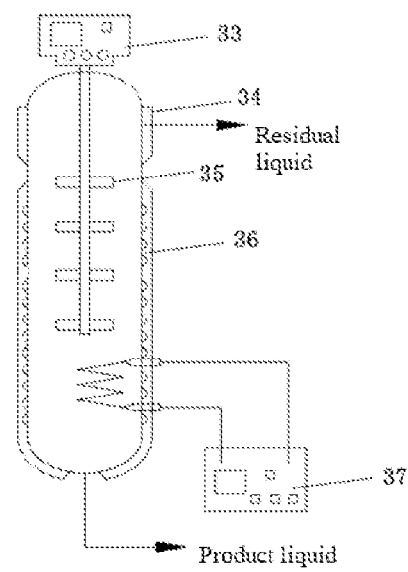
FIG. 6 is a structural diagram of the crystallizer according to an embodiment of the present disclosure.

In FIG. 6:

33 is a motor; 34 is a heat preservation jacket; 35 is a stirring paddle; 36 is a heating mixing pipe; 37 is a heating device.

Figure 7:
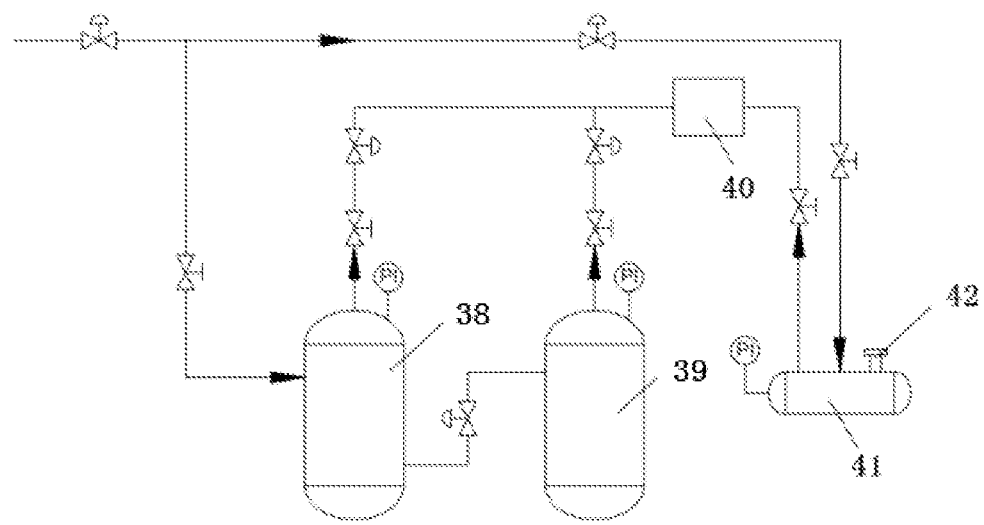
FIG. 7 is a structural diagram of the filling system according to an embodiment of the present disclosure.

In FIG. 7:

38 is a buffer tank; 39 is a product tank; 40 is a vacuum group; 41 is a sampling tank; 42 is a sampling port.

DETAILED DESCRIPTION OF THE EMBODIMENTS

Technical solutions of the present disclosure will be clearly and completely described below with reference to the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Embodiment 1

Figure 1:
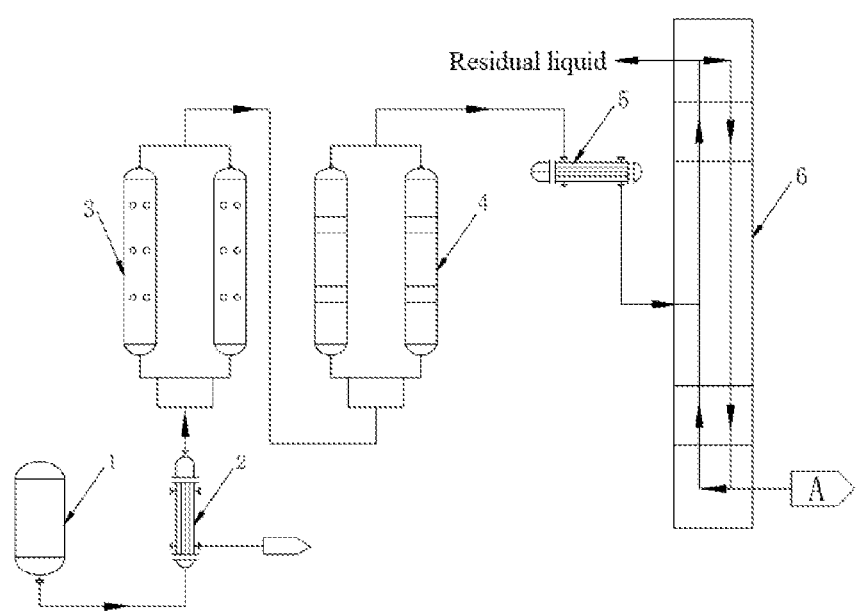
FIG. 1 is a flowchart showing the structure of the adsorption system+crystallizer according to an embodiment of the present disclosure.
Figure 2:
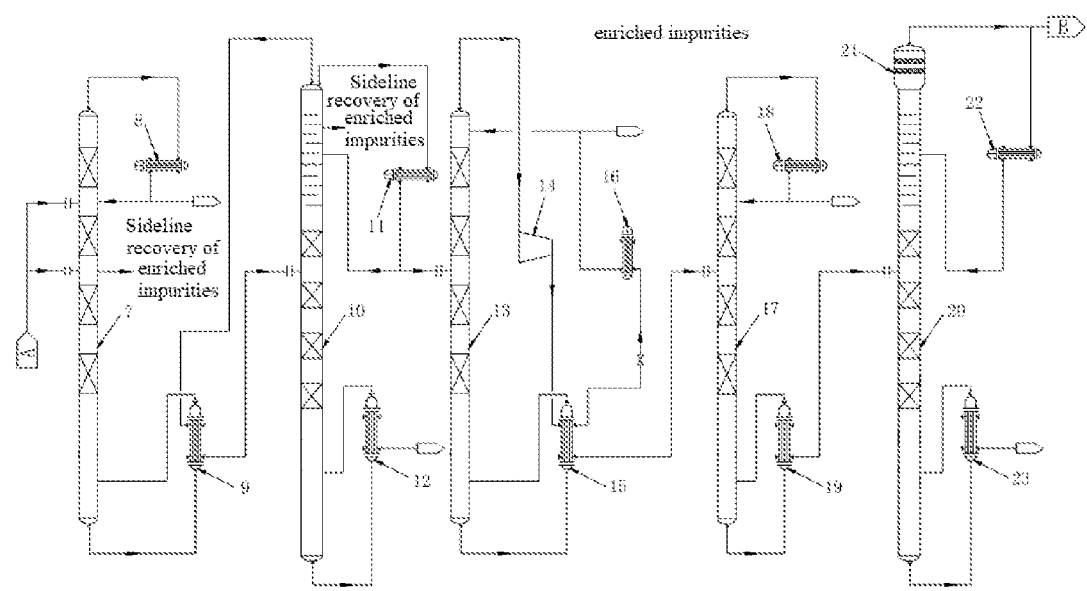
FIG. 2 is a flowchart showing the structure of the distillation system according to an embodiment of the present disclosure.
Figure 3:
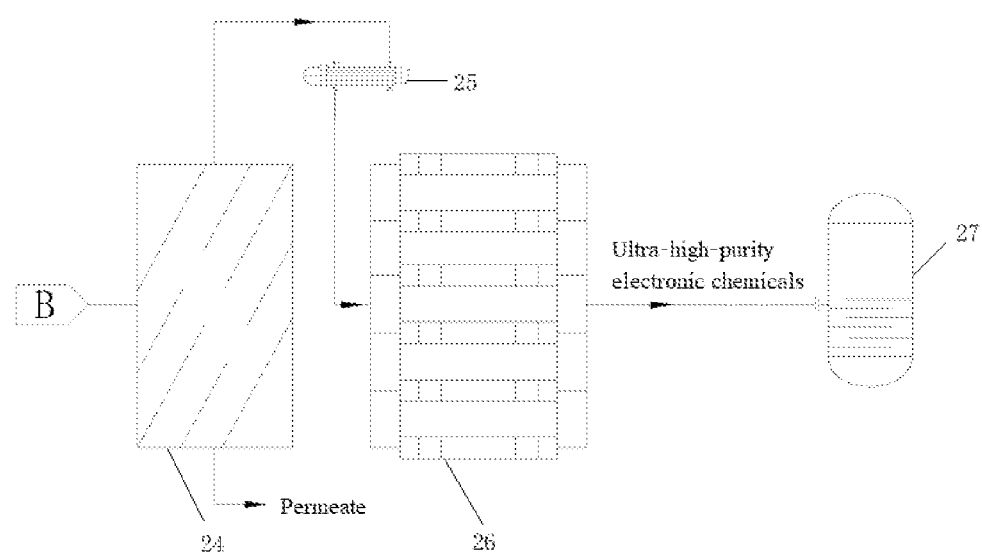
FIG. 3 is a flow chart of the structure of the vapor permeation device+membrane separation system+filling system according to an embodiment of the present disclosure.

Embodiment 1 of the present disclosure provides a production system of general-purpose integrated circuit ultra-high-purity electronic chemicals, as shown in FIG. 1, which mainly includes: raw material tank 1, adsorption system, crystallizer 6, distillation system, vapor permeation device 24, membrane separation system and filling system 27.

The adsorption system includes a first adsorption device 3 and a second adsorption device 4.

The distillation system includes a first light-impurity removal tower 7, a first heavy-impurity removal tower 10, a second light-impurity removal tower 13, a motorized tower 17 and a second heavy-impurity removal tower 20.

The raw material tank 1 is connected to the tower kettle inlet of the first adsorption device 3 through the adsorption system heater 2. The tower top outlet of the first adsorption device 3 is connected with the tower kettle inlet of the second adsorption device 4.

The tower top outlet of the second adsorption device 4 is connected to the feed port of the crystallizer 6 through the adsorption system condenser 5.

The outlet of the crystallizer 6 is connected with the inlet of the first light-impurity removal tower 7. The tower top outlet of the first light-impurity removal tower 7 is connected with the tower top reflux inlet of the first light-impurity removal tower 7 through the first light-impurity removal tower condenser 8.

The tower kettle outlet of the first light-impurity removal tower 7 is connected with the inlet of the first heavy-impurity removal tower 10 through the first light-impurity removal tower reboiler 9.

One tower top outlet of the first heavy-impurity removal tower 10 is connected to the inlet of the first heavy-impurity removal tower 10 through the first light-impurity removal tower reboiler 9.

The other tower top outlet of the first heavy-impurity removal tower 10 is connected to the inlet of the second light-impurity removal tower 13 through the first heavy-impurity removal tower condenser 11. The tower kettle of the first heavy-impurity removal tower 10 is connected with the first heavy-impurity removal tower reboiler 12.

The tower top outlet of the second light-impurity removal tower 13 is connected with the tower top reflux inlet of the second light-impurity removal tower 13 through the heat pump compressor 14, the second light-impurity removal tower reboiler 15, and the heat pump condenser 16 in turn. The tower kettle of the second light-impurity removal tower 13 is connected to the inlet of the motorized tower 17 through the second light-impurity removal tower reboiler 15.

The tower top outlet of the motorized tower 17 is connected with the tower top reflux inlet of the motorized tower 17 through the motorized tower condenser 18. The tower kettle of the motorized tower 17 is connected to the inlet of the second heavy-impurity removal tower 20 through the motorized tower reboiler 19.

The mist eliminator 21 is installed on the top of the second heavy-impurity removal tower 20, and the top outlet is connected to the top reflux inlet through the second heavy-impurity removal tower condenser 22, meanwhile the top outlet is connected to the vapor permeation device 24. The tower kettle of the second heavy-impurity removal tower 20 is connected to the second heavy-impurity removal tower reboiler 23.

The vapor permeation device 24 is connected to the membrane separation device 26 through a condenser 25.

The membrane separation device 26 is provided with an ultra-high-purity electronic chemical product outlet and is connected to the filling system 27.

Here, the adsorption beds of the first adsorption device 3 and the second adsorption device 4 adopt advanced adsorbent as the adsorption medium.

Specifically, the adsorbent of the first adsorption device 3 is molecular sieve.

Specifically, the molecular sieve adopts hexagonal mesoporous or cubic mesoporous, which is optimized in terms of pore size, and the active substance is loaded on the molecular sieve.

Specifically, the adsorbent of the second adsorption device 4 is an adsorption resin.

Specifically, a three-dimensional spatial hole structure is formed inside the resin, and a random cluster structure is formed outside the adsorption resin. Meanwhile, the composite material method is used to improve.

Here, the crystallizer 6 is divided into three parts: a crystallization section, a separation section, and a melting section.

Specifically, the upper part of the crystallizer 6 is provided with a heat preservation device. The middle part is provided with a feed port, and the raw material liquid is fed in the middle part. The lower end is provided with a heating device 37. And the upper end and the lower end are respectively provided with a residual liquid overflow outlet and a product liquid outlet.

Specifically, a heat preservation jacket 34 is arranged outside the crystallizer 6 to stabilize the internal temperature. A heating mixing pipe 36 is arranged inside the jacket to make the temperature difference at each position. At the same time, a temperature measuring device is arranged at each position.

Specifically, a stirring device is installed inside the crystallizer 6, and is driven by a motor 33. The stirring paddles 35 of the stirring device are evenly distributed below the liquid surface, and sufficient stirring can be achieved.

The distillation system adopts tray tower, packed tower or tray packed composite tower, and the distillation process adopts azeotropic distillation, extractive distillation, complexation extractive distillation and other special distillation methods, as well as energy-saving methods such as multi tower differential pressure integrated distillation energy-saving technology and heat pump technology.

Specifically, the tray tower or the tray packed composite tower can adopt advanced tray structure. The tray is mainly provided with screen holes, float valves, caps or other channels of uniform size. At the same time, the guide holes 31 can be opened on the surface of the tray. The liquid flows horizontally from the liquid receiving area 32 to the downcomer 29, and the gas flows upward through the screen holes 30, float valves, caps or other channels.

Specifically, the opening density and direction of the guide holes 31 are different in different areas of the tray, specifically to promote the flow of the fluid piston flow on the tray, and the corresponding changes and adjustments are made according to the distribution of the fluid on its surface.

Specifically, all kinds of distillation towers can adopt a new tower body structure, that is, the top of the distillation tower can be provided with an amplification section, so that the diameter of the top of the tower is larger than the diameter of the lower end of the tower. By adopting a large diameter, the gas rising speed in this section is reduced, and the entrainment of mist in the process can be effectively reduced.

Specifically, extractive distillation increases the relative volatility of the original components by adding another component (called extractant) to the raw material liquid, thereby breaking the azeotrope and realizing the separation of azeotropes.

Specifically, azeotropic distillation changes the relative volatility between the systems to be separated, and the separation is realized by forming a new azeotrope with the added azeotropic agent and one or more of their components. Generally, it is divided into two types: homogeneous azeotropic distillation and heterogeneous azeotropic distillation.

Specifically, complexation extractive distillation makes the substance to be separated contact with the complexation extraction solvent system, and the complexing agent forms a complex with the solute to be separated, so that it can be transferred to the extraction phase to achieve the purpose of separation. It overcomes the disadvantages of many separation processes, such as consuming a large amount of expensive reactants and changing the chemical form of reaction products.

Specifically, multi effect distillation pressurizes or depressurizes some of the towers, and uses the vapor on the tower top as the heating medium of the reboiler of another atmospheric tower in the process, thereby saving the use of additional heat sources.

Specifically, the heat pump distillation causes some of the tower top vapor to be heated and pressurized by the compressor, which serves as the heating medium of the reboiler of the tower to effectively recover the condensation latent heat of the tower top vapor.

The mist eliminator 21 adopts impact separation baffle, wire mesh demisting or fiber demisting or other methods.

The configuration of the vapor permeation device 24 includes a plate type, a tube type, a hollow fiber type and other forms. The vapor permeation membrane element adopts PVA membrane, NaA molecular sieve membrane, T-type molecular sieve membrane, MOR molecular sieve membrane or other kinds of organic or inorganic membranes.

Specifically, the formulation of the vapor permeation membrane of the vapor permeation device 24 may use polysulfone, polyphenylene ether, aromatic polyamide, polytetrafluoroethylene, polypropylene, polyacrylonitrile, polyvinyl alcohol, polybenzimidazole, polyimide, or other polymer materials as the membrane material.

The membrane separation device 26 adopts nanofiltration, microfiltration, ultrafiltration, reverse osmosis, pervaporation or other methods.

The filling system 27 includes equipment and structures such as the buffer tank 38, the product tank 39, the vacuum group 40, the sampling tank 41, the sampling port 42, and a series of pneumatic valves and diaphragm valves, and each equipment is equipped with a pressure indicator.

Specifically, the product tank structure includes a feed port, a vacuum pipe port, a pressure indicator, a liquid level indicator and a spring triangle safety valve.

Embodiment 2

Based on the production system of the general-purpose integrated circuit ultra-high-purity electronic chemicals provided in embodiment 1, the joint production of electronic grade trichlorosilane includes the following steps.

(1) Trichlorosilane, a by-product in polysilicon production, is sent to the adsorption system for adsorption and separation to remove trace impurities such as boron, phosphorus, hydrogen bonds and oxygen bonds. Because of their high absorption intensity of light, the loss of optical fiber is prone to be increased, and such impurities are prone to association reaction in the distillation process. Therefore, the adsorption device is used first to remove them as much as possible. Since SiHCl3 is not a symmetric molecule, the adsorbents of activated alumina and silica gel are used as the adsorption media. The adsorption system uses two towers to complete the adsorption and desorption process in turn. After the adsorption is completed, nitrogen is blown into the adsorption system to desorb impurities. Nitrogen can be recycled and the adsorption time can be controlled.

(2) The trichlorosilane after the adsorption and removal of impurities is sent to the first light-impurity removal tower 7 to remove the light impurities boron trichloride, hydrogen chloride and hydrogen. The first light-impurity removal tower 7 is a packed tower, and the equipment material is 316L ultra clean electropolishing material to ensure the high purity of the product. The kettle liquid is trichlorosilane, silicon tetrachloride and high boiling material.

(3) The obtained kettle liquid is sent to the first heavy-impurity removal tower 10 for separation. The first heavy-impurity removal tower 10 is a tray packed composite tower, with 40 layers of trays at the top and packing at the lower section. Electronic grade trichlorosilane is obtained through the tray to avoid contamination of the product by impurities in the packing. 316L ultra clean electropolishing material is used as the equipment material to ensure the high purity of the product, and the multi effect distillation mode is adopted between the two towers in the process. The tower top vapor of the first heavy-impurity removal tower 4 is used as the heat source of the reboiler at the tower kettle of the first light-impurity removal tower 7 to reduce utilities. The high boiling impurities containing silicon tetrachloride and phosphorus chloride liquid are removed, and the enriched trichlorosilane product is obtained.

(4) The produced liquid from the first heavy-impurity removal tower 10 is sent to the second light-impurity removal tower 13 to further remove light component impurities.

(5) The produced liquid from the second light-impurity removal tower 13 is sent to the motorized tower 17 for random removal of light component impurities and heavy component impurities.

(6) The produced liquid from the motorized tower 17 is sent to the second heavy-impurity removal tower 20 for separation. The second heavy-impurity removal tower 20 is a tray packed composite tower, with 40 layers of trays in the upper section and packing in the lower section. The heavy component impurities are further removed to obtain trichlorosilane product after re-enrichment.

Among them, the first light-impurity removal tower 7, the first heavy-impurity removal tower 10, the second light-impurity removal tower 13, the motorized tower 17 and the second heavy-impurity removal tower 20 are all provided with sampling ports from which the composition of the analyzed products can be obtained.

(7) The produced liquid from the second heavy-impurity removal tower 20 is sent to the membrane separation device 26 to remove trace solid particles and other metal ion impurities to obtain electronic grade trichlorosilane products. The membrane separation device 26 adopts nanofiltration, and the purity reaches 99.999999%, which can be used for the manufacture of electronic components.

Through the above production method, the energy-saving technology adopted enables 42% energy saving after the final trichlorosilane distillation is implemented, and the product purity reaches 99.9999999%, wherein the impurity content is boron and phosphorus 0.15 ppb.

The product scale of the embodiment 2 is 200 tons/year and the production time is 330 days.

Embodiment 3

Based on the production system of the general-purpose integrated circuit ultra-high-purity electronic chemicals provided in embodiment 1, the joint production of electronic grade trichlorosilane includes the following steps.

(1) The industrial grade crude trichlorosilane synthesized by the improved Siemens method is sent to the adsorption system for adsorption and separation to remove trace impurities such as boron, phosphorus, hydrogen bonds and oxygen bonds. Because of their high absorption intensity of light, the loss of optical fiber is prone to be increased, and such impurities are prone to association reaction in the distillation process. Therefore, the adsorption device is used first to remove them as much as possible. Since SiHCl3 is not a symmetric molecule, the adsorbents of activated alumina and silica gel are used as the adsorption media. The adsorption system uses two towers to complete the adsorption and desorption process in turn. After the adsorption is completed, nitrogen is blown into the adsorption system to desorb impurities. Nitrogen can be recycled and the adsorption time can be controlled.

(2) The trichlorosilane after the adsorption and removal of impurities is sent to the first light-impurity removal tower 7 to remove the light impurities boron trichloride, hydrogen chloride and hydrogen. The first light-impurity removal tower 7 is a packed tower, and the equipment material is 316L ultra clean electropolishing material to ensure the high purity of the product. The kettle liquid is trichlorosilane, silicon tetrachloride and high boiling material.

(3) The obtained kettle liquid is sent to the first heavy-impurity removal tower for separation. The first heavy-impurity removal tower 10 is a tray packed composite tower, with 40 layers of trays at the top and packing at the lower section. Electronic grade trichlorosilane is obtained through the tray to avoid contamination of the product by impurities in the packing. 316L ultra clean electropolishing material is used as the equipment material to ensure the high purity of the product, and the multi effect distillation mode is adopted between the two towers in the process. The tower top vapor of the first heavy-impurity removal tower 10 is used as the heat source of the first light-impurity removal tower reboiler 9 to reduce utilities. The high boiling impurities containing silicon tetrachloride and phosphorus chloride liquid are removed, and the enriched trichlorosilane product is obtained.

(4) The produced liquid from the first heavy-impurity removal tower 10 is sent to the second light-impurity removal tower 13 to further remove light component impurities.

(5) The produced liquid from the second light-impurity removal tower 13 is sent to the motorized tower 17 for random removal of light component impurities and heavy component impurities.

(6) The produced liquid from the motorized tower 17 is sent to the second heavy-impurity removal tower 20 for separation. The second heavy-impurity removal tower 20 is a tray packed composite tower, with 40 layers of trays in the upper section and packing in the lower section. The heavy component impurities are further removed to obtain trichlorosilane product after re-enrichment. The first light-impurity removal tower 7, the first heavy-impurity removal tower 10, the second light-impurity removal tower 13, the motorized tower 17 and the second heavy-impurity removal tower 20 are all provided with sampling ports from which the composition of the analyzed products can be obtained.

(7) The produced liquid from the second heavy-impurity removal tower 20 is sent to the membrane separation device 26 to remove trace solid particles and other metal ion impurities to obtain electronic grade trichlorosilane products. The membrane separation device 26 adopts nanofiltration, and the purity reaches 99.9999999%, which can be used for the manufacture of electronic components.

The product scale of the embodiment 3 is 200 tons/year and the production time is 330 days.

Through the above production method, the energy-saving technology adopted enables 42% energy saving after the final trichlorosilane distillation is implemented, and the product purity reaches 99.9999999%, wherein the impurity content is boron 0.13 ppb and phosphorus 0.15 ppb.

Embodiment 4

Based on the production system of the general-purpose integrated circuit ultra-high-purity electronic chemicals provided in embodiment 1, the joint production of high purity silicon tetrachloride includes the following steps.

Silicon tetrachloride from cold hydrogenation of polysilicon: 99% silicon tetrachloride, 0.2% trichlorosilane, 0.8% hydrogen chloride and trace impurities.

(1) Silicon tetrachloride, a by-product of polysilicon production, is sent to the adsorption system as raw material for further adsorption and separation. As impurities in silicon tetrachloride such as boron trichloride and phosphorus trichloride belong to asymmetric molecules of dipole moment, while silicon tetrachloride belongs to symmetric molecules without dipole moment, advanced adsorbents activated alumina and silica gel are used as adsorption media. For impurities such as trace metal ions and hydroxyl in raw materials, polymethylmethacrylate microspheres are used for accurate adsorption.

Therefore, the multi-layer adsorption structure of activated alumina-silica gel-polymethylmethacrylate microspheres is adopted as the adsorption medium, and four towers are used to complete the adsorption and desorption process in turn. The temperature of the adsorption process is controlled at 5~150° C., and the pressure is controlled at 5~500 kPa. After the adsorption is completed, the nitrogen is blown into the adsorption tower to desorb the impurities. The nitrogen can be recycled to control the adsorption time. Nitrogen or other gases are introduced during the desorption process for 5~120 min, the temperature is controlled at 50~200° C., and the pressure is controlled at 50~200 kPa.

This process mainly removes trace impurities such as boron, phosphorus, hydrocarbon bond and hydrogen oxygen bond. The reason is that the absorption intensity of light is high, which will increase the loss of optical fiber. During the distillation process, such impurities are prone to association reaction. Therefore, adsorption device is used first to remove them as much as possible.

(2) The raw material from the previous section is sent to the first light-impurity removal tower 7 through the raw material pump to remove light impurities such as trichlorosilane, boron trichloride, hydrogen chloride and hydrogen. The first light-impurity removal tower 7 is a packed tower. The operating pressure of the first light-impurity removal tower 7 is controlled at 0.05~1 MPa and the reflux ratio is controlled at 1~12. 316L ultra clean electropolishing material is used for equipment materials to ensure high purity of products. The kettle liquid is mainly silicon tetrachloride and high boiling substance;

(3) The kettle liquid obtained from the first light-impurity removal tower 7 is pumped into the first heavy-impurity removal tower 10 through the buffer tank for separation. The first heavy-impurity removal tower 10 is a tray filled composite tower. The top of the tower is provided with 40 layers of trays, and the lower section is provided with packing. Silicon tetrachloride containing a small amount of trichlorosilane is obtained through the trays to avoid impurities in the packing contaminating the product. The operating pressure of the first heavy-impurity removal tower 10 is controlled at 0.05~1 MPa, and the reflux ratio is controlled at 1~12. 316L ultra clean electropolishing material is used for equipment materials to ensure high purity of products. For the first heavy-impurity removal tower 10, the indirect heat pump distillation is adopted, and external working medium is introduced. The phase change enthalpy of external working medium is used for tower top condensation, and then the temperature is raised and boosted by the compressor, which becomes the heating medium of the tower reboiler again, and finally circulates back to the initial state. It avoids possible pollution to the original process stream and reduces the consumption of utilities. Water can be used as the working medium, and refrigerants such as R123, R134a, R152a, R227ea, r236fa, R245fa, etc.

(4) The tower top distillate obtained from the first heavy-impurity removal tower 10 is sent to the photochemical reaction tower. Ultraviolet light is used as the light source for photochemical reaction, and chlorine gas in the proportion or excess corresponding to the amount of raw material is introduced into the bottom of photochemical reaction tower to react a very small amount of trichlorosilane into silicon tetrachloride and hydrogen chloride. The top temperature of the photochemical reaction tower is controlled at 20~100° C., the temperature of the tower bottom is controlled at 20~100° C., the reflux ratio is controlled at 1~5, the wavelength of the ultraviolet lamp is controlled at 250~450 nm, and the power is controlled at 0.5~5 kW. The silicon tetrachloride, hydrogen chloride and unreacted excess chlorine gas at the outlet of the photochemical reaction tower are sent to the desorption tower. The chlorine gas containing a small amount of hydrogen chloride is collected from the top of the tower and returned to the photochemical reaction tower for recycling. Silicon tetrachloride is obtained from the kettle liquid of the tower, and the reflux ratio of the desorption tower is controlled at 1~15.

The tower top distillate components of the first heavy-impurity removal tower are sent to the second light-impurity removal tower 13 to further remove light impurities such as hydrogen chloride. The silicon tetrachloride is recovered by reflux at the top of the tower. The operating pressure of the second lightening tower 13 is controlled at 0.05-1 MPa and the reflux ratio is controlled at 1-20. Then, the obtained kettle liquid is sent to the motorized tower 17 for separation, and the light component impurities and heavy component impurities are removed at random. The silicon tetrachloride produced liquid is sent to the second heavy-impurity removal tower 20 to further remove the heavy component impurities. The second heavy-impurity removal tower 20 is a tray packed composite tower, with 40 layers of trays in the upper section and packing in the lower section. The operating pressure of the second heavy-impurity removal tower 20 is controlled at 0.05~1 MPa, and the reflux ratio is controlled at 1~12 to obtain the final enriched optical fiber grade silicon tetrachloride with a purity of 99.9999999999%, which can be used for semiconductor device manufacturing.

The distillation tower which produces the optical fiber grade silicon tetrachloride in embodiment 4 is equipped with a thermometer and a pressure meter, and the composition of the analyzed product can be obtained from the sampling port. The product scale is 10000 tons/year, and the production time is 330 days.

Embodiment 5

Based on the production system of the general-purpose integrated circuit ultra-high-purity electronic chemicals provided in embodiment 1, the joint production of high purity silicon tetrachloride includes the following steps.

(1) Industrial grade silicon tetrachloride raw material prepared by ferrosilicon chlorination is sent to the adsorption system as raw material for further adsorption and separation. As impurities in silicon tetrachloride such as boron trichloride and phosphorus trichloride belong to asymmetric molecules of dipole moment, while silicon tetrachloride belongs to symmetric molecules without dipole moment, advanced adsorbents activated alumina and silica gel are used as adsorption media. For impurities such as trace metal ions and hydroxyl in raw materials, polymethylmethacrylate microspheres are used for accurate adsorption. Therefore, the multi-layer adsorption structure of activated alumina-silica gel-polymethylmethacrylate microspheres is adopted as the adsorption medium, and four towers are used to complete the adsorption and desorption process in turn. The temperature of the adsorption process is controlled at 5~150° C., and the pressure is controlled at 5~500 kPa. After the adsorption is completed, the nitrogen is blown into the adsorption tower to desorb the impurities. The nitrogen can be recycled to control the adsorption time. Nitrogen or other gases are introduced during the desorption process for 5~120 min, the temperature is controlled at 50~200° C., and the pressure is controlled at 50~200 kPa. This process mainly removes trace impurities such as boron, phosphorus, hydrocarbon bond and hydrogen oxygen bond. The reason is that the absorption intensity of light is high, which will increase the loss of optical fiber. During the distillation process, such impurities are prone to association reaction. Therefore, adsorption device is used first to remove them as much as possible.

(2) The raw material from the previous section is sent to the first light-impurity removal tower 7 through the raw material pump to remove light impurities such as trichlorosilane, boron trichloride, hydrogen chloride and hydrogen. The first light-impurity removal tower 7 is a packed tower. The operating pressure of the first light-impurity removal tower 7 is controlled at 0.05~1 MPa and the reflux ratio is controlled at 1~12. 316L ultra clean electropolishing material is used for equipment materials to ensure high purity of products. The kettle liquid is mainly silicon tetrachloride and high boiling substance;

(3) The kettle liquid obtained from the first light-impurity removal tower 7 is pumped into the first heavy-impurity removal tower 10 through the buffer tank for separation. The first heavy-impurity removal tower 10 is a tray filled composite tower. The top of the tower is provided with 40 layers of trays, and the lower section is provided with packing. Silicon tetrachloride containing a small amount of trichlorosilane is obtained through the trays to avoid impurities in the packing contaminating the product. The operating pressure of the first heavy-impurity removal tower 10 is controlled at 0.05~1 MPa, and the reflux ratio is controlled at 1~12. 316L ultra clean electropolishing material is used for equipment materials to ensure high purity of products. For the first heavy-impurity removal tower 10, the indirect heat pump distillation is adopted, and external working medium is introduced. The phase change enthalpy of external working medium is used for tower top condensation, and then the temperature is raised and boosted by the compressor, which becomes the heating medium of the tower reboiler again, and finally circulates back to the initial state. It avoids possible pollution to the original process stream and reduces the consumption of utilities. Water can be used as the working medium, and refrigerants such as R123, R134a, R152a, R227ea, r236fa, R245fa, etc.

(4) The tower top distillate obtained from the first heavy-impurity removal tower 10 is sent to the photochemical reaction tower. Ultraviolet light is used as the light source for photochemical reaction, and chlorine gas in the proportion or excess corresponding to the amount of raw material is introduced into the bottom of photochemical reaction tower to react a very small amount of trichlorosilane into silicon tetrachloride and hydrogen chloride. The top temperature of the photochemical reaction tower is controlled at 20~100° C., the temperature of the tower bottom is controlled at 20~100° C., the reflux ratio is controlled at 1~5, the wavelength of the ultraviolet lamp is controlled at 250~450 nm, and the power is controlled at 0.5~5 kW. The silicon tetrachloride, hydrogen chloride and unreacted excess chlorine gas at the outlet of the photochemical reaction tower are sent to the desorption tower. The chlorine gas containing a small amount of hydrogen chloride is collected from the top of the tower and returned to the photochemical reaction tower for recycling. Silicon tetrachloride is obtained from the kettle liquid of the tower, and the reflux ratio of the desorption tower is controlled at 1~15.

(5) The tower top distillate components of the first heavy-impurity removal tower 10 are sent to the second light-impurity removal tower 13 to further remove light impurities such as hydrogen chloride. The silicon tetrachloride is recovered by reflux at the top of the tower. The operating pressure of the second lightening tower 13 is controlled at 0.05-1 MPa and the reflux ratio is controlled at 1-20. Then, the obtained kettle liquid is sent to the motorized tower 17 for separation, and the light component impurities and heavy component impurities are removed at random. The silicon tetrachloride produced liquid is sent to the second heavy-impurity removal tower 20 to further remove the heavy component impurities. The second heavy-impurity removal tower 20 is a tray packed composite tower, with 40 layers of trays in the upper section and packing in the lower section. The operating pressure of the second heavy-impurity removal tower 20 is controlled at 0.05~1 MPa, and the reflux ratio is controlled at 1~12 to obtain the final enriched optical fiber grade silicon tetrachloride with a purity of 99.9999999999%, which can be used for semiconductor device manufacturing.

The distillation tower which produces the optical fiber grade silicon tetrachloride in embodiment 5 is equipped with thermometers and pressure meters, and the composition of the analyzed product can be obtained from the sampling port. The product scale is 10000 tons/year, and the production time is 330 days.

Various embodiments in the present specification are described in a progressive manner, and the emphasizing description of each embodiment is different from the other embodiments. The same and similar parts of various embodiments can be referred to for each other. For the equipment disclosed in the embodiments, since the apparatus corresponds to the method disclosed in the embodiments, the description is simplified, and reference may be made to the method part for description.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. A production system of general-purpose high-purity chemicals, comprising a raw material tank, and an adsorption system, a crystallizer, a first light-impurity removal tower, a first heavy-impurity removal tower, a second light-impurity removal tower, a separation tower, a second heavy-impurity removal tower, a vapor permeation device, a membrane separation system and a filling system connected with the raw material tank in sequence;

wherein the adsorption system comprises a first adsorption device and a second adsorption device, wherein an outlet of the first adsorption device is connected to a feed port of the second adsorption device, and an outlet of the second adsorption device is connected to a feed port of the crystallizer through an adsorption system condenser.

2. The production system of general-purpose high-purity chemicals of claim 1, wherein the raw material tank is connected with a tower kettle inlet of the first adsorption device through an adsorption system heating device;

upper and lower parts of the crystallizer are provided with a heat preservation device, a middle part is provided with a feed port, and the upper and lower parts of the crystallizer are respectively provided with a residual liquid overflow port and an intermediate product outlet.

3. The production system of general-purpose high-purity chemicals of claim 1, wherein a tower top of the first light-impurity removal tower is connected with a first light-impurity removal tower condenser for condensation reflux, a tower kettle outlet is connected with an inlet of the first heavy-impurity removal tower through a first light-impurity removal tower reboiler, and the first light-impurity removal tower reboiler is configured to perform kettle liquid reboiling;

one outlet of the first heavy-impurity removal tower is connected to an inlet of the first heavy-impurity removal tower through the first light-impurity removal tower reboiler, and the other outlet is connected to an inlet of the second light-impurity removal tower through a first heavy-impurity removal tower condenser, and condensation reflux is performed through the first heavy-impurity removal tower condenser; a tower kettle is connected with the first heavy-impurity removal tower reboiler, and the first heavy-impurity removal tower reboiler is configured to perform kettle liquid reboiling;

a tower kettle outlet of the second light-impurity removal tower is connected with an inlet of the separation tower through a second light-impurity removal tower reboiler, and the second light-impurity removal tower reboiler is configured to perform kettle liquid reboiling;

a tower top of the separation tower is connected with a separation tower condenser for condensation reflux, a tower kettle outlet is connected with an inlet of the second heavy-impurity removal tower through a separation tower reboiler, and the separation tower reboiler is configured to perform kettle liquid reboiling;

a tower top of the second heavy-impurity removal tower is connected with a second heavy-impurity removal tower condenser for condensation reflux, and is connected with an inlet of the vapor permeation device through a second heavy-impurity removal tower condenser; a tower kettle is connected with a second heavy-impurity removal tower reboiler, and the first heavy-impurity removal tower reboiler is configured to perform kettle liquid reboiling;

an outlet of the vapor permeation device is connected with an inlet of the membrane separation device through a condenser.

4. The production system of general-purpose high-purity chemicals of claim 1, wherein the first light-impurity removal tower, the first heavy-impurity removal tower, the second light-impurity removal tower, the separation tower and the second heavy-impurity removal tower all adopt tray tower, packed tower or tray packed composite tower;

wherein, both the tray tower and the tray packed composite tower adopt advanced tray structure, and the tray is provided with screen holes, float valves or cap channels with uniform size and specifications arranged and distributed in a regular triangle manner; at the same time, guide holes may be set on the surface of the tray, the liquid flows horizontally from a liquid receiving area to a downcomer, and the gas flows upward through the screen holes, float valves or cap channels; and the tray is provided with an overflow weir area, wherein a height of the overflow weir area is greater than a bottom gap height of the downcomer, and an area of the liquid receiving area is greater than an area of the inlet of the downcomer;

or, the first light-impurity removal tower, the first heavy-impurity removal tower, the second light-impurity removal tower, the separation tower and the second heavy-impurity removal tower all adopt a new tower body structure, and a top of the tower is provided with an amplification section, and a diameter of the tower top is greater than a diameter of the lower tower.

5. The production system of general-purpose high-purity chemicals of claim 1, wherein the tower top of the second heavy-impurity removal tower is also provided with a mist eliminator; the mist eliminator adopts the method of impact separation baffle, wire mesh demisting or fiber demisting; the mist eliminator is arranged in a single-layer or multi-layer structure;

the vapor permeation device is provided with a vapor permeation membrane, and a configuration of the vapor permeation membrane comprises a plate type, a tube type or a hollow fiber type;

the vapor permeation membrane comprises any one or a combination of several of PVA membrane, NaA molecular sieve membrane, T-type molecular sieve membrane or MOR molecular sieve membrane, and a membrane material is any one or a combination of several of polysulfone, polyphenylene ether, aromatic polyamide, polytetrafluoroethylene, polypropylene, polyacrylonitrile, polyvinyl alcohol, polyphenylimidazole or polyimide;

the membrane separation system adopts membrane separation modes of nanofiltration, microfiltration, ultrafiltration, reverse osmosis or pervaporation;

the filling system comprises a buffer tank, a product tank, a vacuum group, a sampling tank, a sampling port, and a plurality of pneumatic valves and diaphragm valves; wherein the product tank is provided with a feed port, a vacuum pipe port, a pressure indicator, a liquid level indicator and a spring triangle safety valve, and an inner lining of the product tank is made of PPH material, borosilicate glass, quartz glass, polyethylene, polytetrafluoroethylene, polyvinylidene fluoride, Teflon or PFA material.

6. A production method of general-purpose high-purity chemicals, wherein according to the production system of claim 1, the production method specifically comprises following steps:

1) Adsorption: transporting chemical raw materials from different sources from the raw material tank to the first adsorption device to remove water, hydrocarbon bonds, hydrogen oxygen bonds and trace impurities with high light absorption intensity and easy to occur association reaction in a separation process to obtain treated materials, transporting the treated materials to the second adsorption device for deep removal of water, organic matter and metal ions to obtain gas materials after removal, transporting the gas materials after removal to the adsorption system condenser to be condensed into liquid phase and then transporting to the crystallizer;

2) Crystallization: realizing separation and purification of materials by continuous multi-stage countercurrent stepwise crystallization method or recrystallization method according to the difference in melting point between the target product and various impurities to obtain intermediate products with high purity at the bottom or top of the crystallizer, and transporting the intermediate products to the first light-impurity removal tower;

3) Distillation:

31) passing the intermediate products through the first light-impurity removal tower to remove light component impurities in the material to obtain a first kettle liquid, and transporting the first kettle liquid, mainly the target product, and other heavy component impurities to the first heavy-impurity removal tower to remove heavy component impurities and obtaining an enriched product, and transporting the enriched product to the second light-impurity removal tower; further removing the light component impurities through the second light-impurity removal tower to obtain a second kettle liquid, and then transporting the second kettle liquid to the separation tower;

32) further removing, by the separation tower, light component impurities or heavy component impurities according to a composition of raw materials to obtain a produced liquid, then transporting the produced liquid to the second heavy-impurity removal tower to remove heavy component impurities to obtain a purified product, and transporting the purified product to the vapor permeation device;

4) Vapor permeation: removing entrained liquid droplets in gas flow by the mist eliminator, directly transporting the purified product to the vapor permeation device through gas phase extraction for deep dehydration and impurity removal, extracting a permeate from a permeate side of the vapor permeation membrane, then obtaining a high-purity product vapor on the other side, and then transporting the condensed product vapor to the membrane separation device after the product vapor is condensed by the condenser;

5) Membrane separation: deeply removing, by the membrane separation device, trace solid particles, metal ions and other impurities to obtain a target product, and delivering the target product to the filling system.

7. The production method of general-purpose high-purity chemicals of claim 6, wherein the continuous multi-stage countercurrent stepwise crystallization method described in step 2) comprises following steps: the liquid phase enters the crystallizer to generate crystals in a crystallization section, settles to a separation section for separation and purification, and then enters a melting section for melting into liquid; one part of the tower bottom liquid is output as a product, and the other part is used as a reflux liquid for mass transfer; as the reflux liquid flows upward, the purity gradually decreases, and the reflux liquid is discharged out of the crystallizer as a residual liquid after crystallization separation in the crystallization section;

wherein, a specific location where the solid-liquid countercurrent contact occurs is the separation section, the solid and the liquid continuously undergo phase change and countercurrent washing in the separation section, and a crystal slurry in the separation section forms a crystal bed.

8. The production method of general-purpose high-purity chemicals of claim 6, wherein the first adsorption device described in step 1) uses s molecular sieve as an adsorption medium, the molecular sieve is hexagonal mesoporous or cubic mesoporous, and the pore size is optimized; specifically, the pores are adjusted by using an organic pore expanding agent or a surfactant, and an active material is loaded on the molecular sieve, and the active material is alkali, fluoride, hydrophilic group or metal;

the second adsorption device uses an adsorption resin as an adsorption medium; the adsorption resin is improved by optimizing the pore diameter and composite materials, so that a three-dimensional spatial structure is formed inside the resin and/or a random cluster structure is formed outside the adsorption resin; specifically, small particles are added to a liquid hydrocarbon, the small particles are styrene, a-methylstyrene, methyl methacrylate or propionitrile, and then the corresponding monomers are added, and the monomers are aggregated through an adsorption of small particles.

9. The production method of general-purpose high-purity chemicals of claim 6, wherein the distillation in step 3) comprises but is not limited to extractive distillation, azeotropic distillation or complexation extractive distillation;

the distillation increases a relative volatility among the original components and realizes the separation of azeotropes by adding another component to the intermediate product and/or the the first kettle liquid and/or the enriched product and/or the second kettle liquid and/or the produced liquid;

or, the distillation realizes separation by changing a relative volatility between systems to be separated and forming a new azeotropic system with one or more components by using an azeotropic agent;

or, the distillation brings the systems to be separated into contact with the complex extractive solvent system, and a complexing agent forms a complex with the systems to be separated, and the complex is transferred to the extraction phase to realize separation.

10. The production method of general-purpose high-purity chemicals of claim 6, wherein in step 3), the first light-impurity removal tower, the first heavy-impurity removal tower, the second light-impurity removal tower, the separation tower and the second heavy-impurity removal tower all extract corresponding impurities from the tower top or the tower kettle or a side extracting port opened at a sideline impurity enrichment position;

the first light-impurity removal tower, the first heavy-impurity removal tower, the second light-impurity removal tower, the separation tower and the second heavy-impurity removal tower all adopt multi tower differential pressure integrated distillation energy-saving technology, at least one of the first light-impurity removal tower, the first heavy-impurity removal tower, the second light-impurity removal tower, the distillation tower and the second heavy-impurity removal tower are pressurized or depressurized, and the tower top vapor is used as a heating medium of the reboiler of the other tower;

or at least one of the first light-impurity removal tower, the first heavy-impurity removal tower, the second light-impurity removal tower, the separation tower and the second heavy-impurity removal tower adopts a heat pump technology to raise a temperature and pressure of the tower top vapor through a compressor, and the tower top vapor serves as a heating medium of the reboiler to recover a condensation latent heat of the tower top vapor.

* * * * *